United States Patent
Hashimoto et al.

(10) Patent No.: US 9,478,072 B2
(45) Date of Patent: Oct. 25, 2016

(54) CONTROL DEVICE OF AFTERTREATMENT DEVICE, WORKING VEHICLE, CONTROL SYSTEM, AND CONTROL METHOD OF AFTERTREATMENT DEVICE

(71) Applicant: KOMATSU LTD., Minato-ku, Tokyo (JP)

(72) Inventors: Toshihiro Hashimoto, Hiratsuka (JP); Tatsuro Nakazato, Hiratsuka (JP); Akikazu Miyahara, Oyama (JP); Mitsuyoshi Kimura, Oyama (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 14/368,563

(22) PCT Filed: Feb. 28, 2014

(86) PCT No.: PCT/JP2014/055163
§ 371 (c)(1),
(2) Date: Apr. 9, 2015

(87) PCT Pub. No.: WO2015/129046
PCT Pub. Date: Sep. 3, 2015

(65) Prior Publication Data
US 2015/0248794 A1    Sep. 3, 2015

(51) Int. Cl.
*G06F 7/70* (2006.01)
*F01N 3/00* (2006.01)
(Continued)

(52) U.S. Cl.
CPC .......... *G07C 5/006* (2013.01); *E02F 9/2054* (2013.01); *E02F 9/2066* (2013.01); *E02F 9/267* (2013.01); *F01N 9/002* (2013.01); *F01N 9/007* (2013.01)

(58) Field of Classification Search
USPC ................................ 701/50; 60/276
See application file for complete search history.

(56) References Cited

U.S. PATENT DOCUMENTS

2008/0163610 A1* 7/2008 Baird ............... F01N 3/0842
60/295
2010/0043400 A1* 2/2010 Wang ............... F01N 3/2066
60/276
(Continued)

FOREIGN PATENT DOCUMENTS

EP    2275985         1/2011
JP    2008248653 A   10/2008
(Continued)

OTHER PUBLICATIONS

International Search Report issued May 27, 2014 in International Application No. PCT/JP2014/055163, 9 pages.
(Continued)

*Primary Examiner* — Thomas G Black
*Assistant Examiner* — Tyler Paige
(74) *Attorney, Agent, or Firm* — Fish & Richardson P.C.

(57) ABSTRACT

A controller in a form of an engine controller controls an aftertreatment device for a residual substance in exhaust gas. The engine controller includes a regeneration occurrence-condition output unit that outputs regeneration occurrence-condition data indicating occurrence of a regeneration treatment of the aftertreatment device, and a regeneration division detector that detects division of the regeneration treatment by a key-off operation conducted during execution of the regeneration treatment. The regeneration occurrence-condition output unit outputs regeneration occurrence-condition data that is analyzable to show that a regeneration treatment before the division detected by the regeneration division detector and a regeneration treatment after the division are a series of regeneration treatments.

16 Claims, 7 Drawing Sheets

(51) Int. Cl.
    *G07C 5/00* (2006.01)
    *E02F 9/20* (2006.01)
    *F01N 9/00* (2006.01)
    *E02F 9/26* (2006.01)

(56) References Cited

U.S. PATENT DOCUMENTS

| | | | |
|---|---|---|---|
| 2010/0242443 A1* | 9/2010 | Kodama | F01N 9/002 60/277 |
| 2010/0326058 A1* | 12/2010 | Shibamori | F01N 3/023 60/295 |
| 2011/0000197 A1* | 1/2011 | Kamiya | E02F 9/00 60/295 |
| 2011/0004559 A1 | 1/2011 | Shibamori et al. | |
| 2011/0146240 A1* | 6/2011 | Wilhelm | F01N 3/021 60/274 |
| 2011/0146244 A1* | 6/2011 | Farman | F01N 3/035 60/285 |
| 2011/0197567 A1* | 8/2011 | Mastbergen | F01N 3/0231 60/276 |
| 2012/0003069 A1* | 1/2012 | Hagiwara | E02F 9/226 414/685 |
| 2012/0125081 A1* | 5/2012 | Yadav | F01N 11/00 73/23.33 |
| 2012/0330531 A1* | 12/2012 | Noma | F02D 41/263 701/102 |
| 2013/0086890 A1* | 4/2013 | Noma | F02D 41/029 60/277 |

FOREIGN PATENT DOCUMENTS

| | | |
|---|---|---|
| JP | 2010203297 A | 9/2010 |
| JP | 2010270726 A | 12/2010 |
| JP | 2011014003 A | 1/2011 |

OTHER PUBLICATIONS

Office Action issued for corresponding CN Patent Application No. 201480000482.9 on Apr. 6, 2016, 7 pages, with English Translation.

* cited by examiner

FIG. 4

| No. | EVENT OCCURRENCE TIME EVENT TIME | ACCUMULATED REGENERATION NEEDED COUNT NEEDED COUNT | ACCUMULATED REGENERATION INTERRUPTED COUNT INTERRUPTED COUNT | ACCUMULATED REGENERATION COMPLETED COUNT COMPLETED COUNT | ACCUMULATED REGENERATION DIVIDED COUNT DIVIDED COUNT | REGENERATION START CAUSE CAUSE OF REGENERATION | REGENERATION DURATION TIME REGENERATION TIME (sec) | DOZING FUEL CONSUMPTION DOZING FUEL CONSUMPTION (L) | SMR (H) |
|---|---|---|---|---|---|---|---|---|---|
| 20 | 11/07/2013 13:47:24 | 1 | 0 | 1 | 0 | Scheduled deSoot | 1366 | 1.4 | 1472 |
| 19 | 10/31/2013 10:28:17 | 10 | 0 | 10 | 0 | Scheduled deSoot | 1483 | 0.9 | 1410 |
| 18 | 10/29/2013 09:07:59 | 9 | 0 | 9 | 0 | Scheduled deSoot | 983 | 0.7 | 1364 |
| 17 | 10/25/2013 14:34:14 | 8 | 0 | 8 | 0 | Automatic deSoot | 2322 | 2.9 | 1327 |
| 16 | 10/25/2013 13:19:35 | 7 | 0 | 7 | 0 | Automatic deSoot | 820 | 3.2 | 1322 |
| 15 | 10/24/2013 15:10:30 | 6 | 0 | 6 | 0 | Automatic deSoot | 1629 | 2.2 | 1302 |
| 14 | 10/23/2013 21:42:39 | 5 | 0 | 5 | 0 | Automatic deSoot | 945 | 1.3 | 1267 |
| 13 | 10/22/2013 03:15:13 | 4 | 0 | 4 | 0 | Automatic deposit removal | 3569 | 2.5 | 1242 |
| 12 | 10/19/2013 17:38:34 | 3 | 0 | 3 | 0 | Automatic deSoot | 1190 | 1.7 | 1218 |
| 11 | 10/19/2013 06:01:14 | 2 | 0 | 2 | 0 | Automatic deSoot | 2702 | 1.2 | 1207 |
| 10 | 10/17/2013 13:17:27 | 1 | 0 | 1 | 0 | Scheduled deSoot | 770 | 3.3 | 1188 |
| 9 | 10/10/2013 13:48:19 | 17 | 0 | 15 | 2 | Automatic deposit removal | 3401 | 2.4 | 1122 |
| 8 | 10/10/2013 00:29:25 | 16 | 0 | 14 | 2 | Scheduled deSoot | 596 | 1.8 | 1077 |
| 7 | 10/07/2013 21:03:14 | 15 | 0 | 13 | 2 | Automatic deposit removal | 2602 | 3.3 | 1052 |
| 6 | 10/07/2013 19:33:09 | 14 | 0 | 12 | 2 | Automatic deposit removal | 1122 | 0.1 | 1049 |
| 5 | 10/07/2013 19:06:42 | 13 | 0 | 12 | 1 | Automatic deposit removal | 586 | 0.2 | 1045 |
| 4 | 10/07/2013 03:19:08 | 12 | 0 | 12 | 0 | Scheduled deSoot | 1611 | 1.5 | 1039 |
| 3 | 10/02/2013 20:19:13 | 11 | 0 | 11 | 0 | Automatic deposit removal | 3184 | 3.0 | 992 |
| 2 | 10/02/2013 16:56:03 | 10 | 0 | 10 | 0 | Scheduled deSoot | 1130 | 1.2 | 985 |
| 1 | 09/30/2013 13:05:43 | 9 | 0 | 9 | 0 | Scheduled deSoot | 919 | 2.3 | 941 |

200

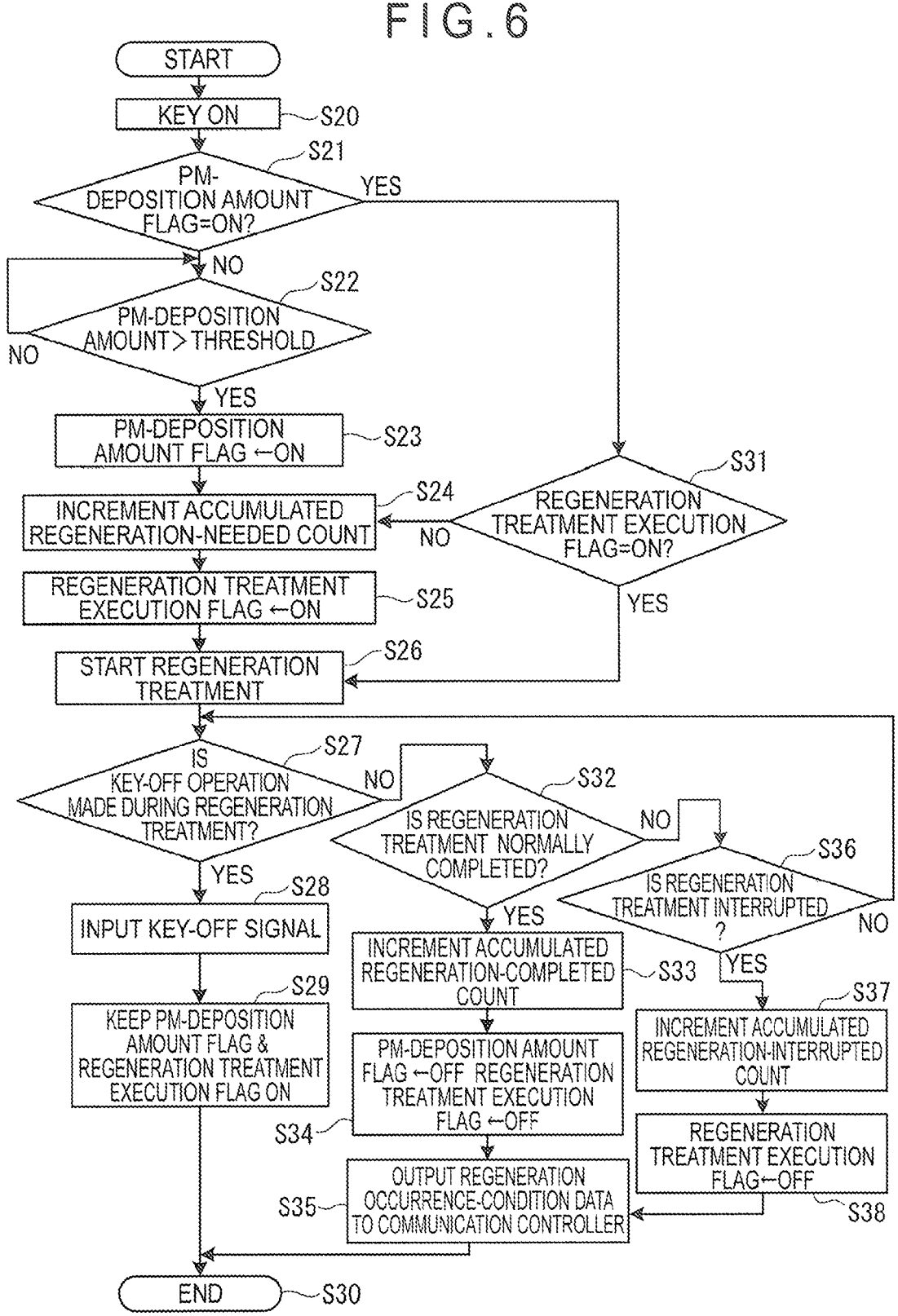

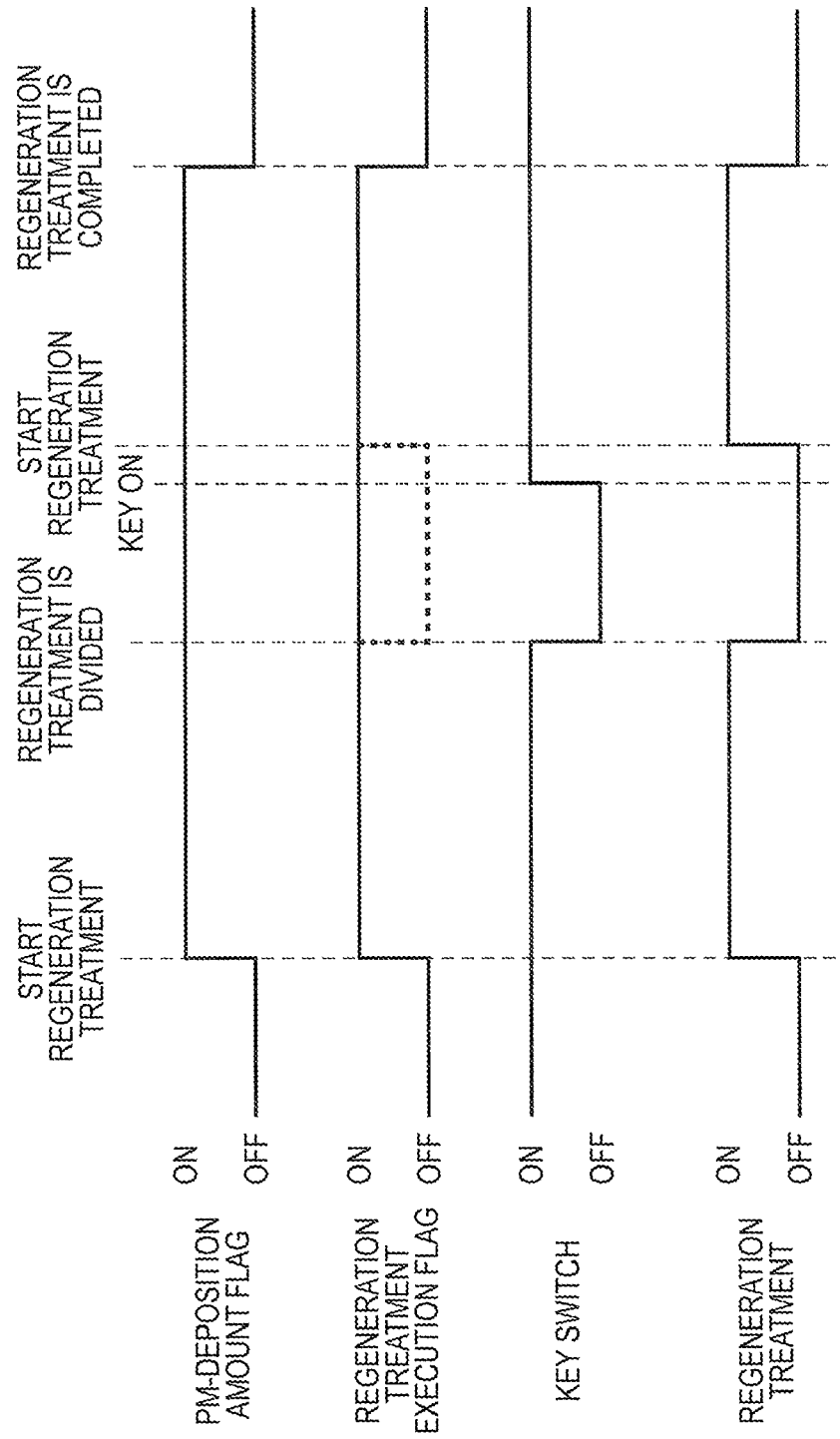

CONTROL DEVICE OF AFTERTREATMENT DEVICE, WORKING VEHICLE, CONTROL SYSTEM, AND CONTROL METHOD OF AFTERTREATMENT DEVICE

CROSS-REFERENCE TO RELATED APPLICATIONS

This application claims priority to International Application No. PCT/JP2014/055163 filed on Feb. 28, 2014, the contents of which application are incorporated herein by reference in its entirety.

TECHNICAL FIELD

The present invention relates to a control device of an aftertreatment device, a working vehicle, a control system, and a control method of an aftertreatment device.

BACKGROUND ART

Recently, in a working vehicle such as various construction machines (e.g., a hydraulic excavator and a wheel loader) used in a mine and a construction site and a delivery vehicle (e.g., a dump truck), information of a position, an operation status, a failure history and the like of the working vehicle is controlled by a control server through communication such as satellite communication, mobile phone communication, and a wireless LAN (Local Area Network) set in a predetermined area such as a mine (see, for instance, Patent Literature 1).

In the above working vehicle, an internal combustion engine such as a diesel engine is used as a driving source. Accordingly, the working vehicle is provided with an aftertreatment device that collects particulate matters (PM) contained in exhaust gas from the diesel engine using a dedicated filter (DPF: Diesel Particulate Filter).

In the aftertreatment device, since the filter becomes clogged as an accumulated amount of the collected PM increases, a regeneration treatment for unclogging the filter by burning the collected PM is conducted.

There has been known an aftertreatment device that transmits a manual regeneration operation count from a controller of a construction machine to a server of a rental company providing the construction machine and uses the manual regeneration operation count for calculation of a maintenance cost (see Patent Literature 2).

In Patent Literature 2, PM is usually burned to be removed by automatic regeneration. However, when PM is not properly removed, a warning to demand a manual regeneration is displayed on a display. When an operator operates a regeneration switch in response to the displayed warning, the manual regeneration is conducted. The controller does a regeneration operation count based on an operation signal from the regeneration switch and transmits the regeneration operation count to a server of an administrative company through a wireless communication device.

CITATION LIST

Patent Literature(s)

Patent Literature 1: JP-A-2008-248653
Patent Literature 2: JP-A-2011-014003

SUMMARY OF THE INVENTION

Problems to be Solved by the Invention

However, in Patent Literature 2, when the operator operates the regeneration switch, the regeneration operation count is done based on the operation signal. Accordingly, when the operator conducts a key-off operation during the regeneration operation, the regeneration operation count cannot be accurately done.

Specifically, when the key-off operation is conducted during the regeneration operation (e.g., at a work closing time), the working vehicle is stopped. Accordingly, the regeneration treatment is also stopped. In this case, when a key-on operation is conducted at a work starting time or the like next day, since the preceding regeneration treatment is terminated halfway, the warning to demand a manual regeneration may be again displayed on the display. Here, the operator operates the regeneration switch to conduct a manual regeneration, whereby an operation signal is inputted to the controller to increment the regeneration operation count by one.

With this operation, the regeneration operation count, which is supposed to be one, is recognized as two. For this reason, when an administrator attempts to grasp an operation status based on the information of the regeneration operation count outputted from the working vehicle, the administrator cannot accurately recognize regeneration treatment conditions of the construction machine.

An object of the invention is to provide: a control device of an aftertreatment device, which can accurately acquire data on regeneration treatment conditions even when a working vehicle is stopped by a key-off operation during the regeneration treatment; a working vehicle; a control system; and a control method of an aftertreatment device.

Means for Solving the Problems

According to an aspect of the invention, a controller controlling an aftertreatment device for a residual substance in exhaust gas includes: a regeneration occurrence-condition output unit that outputs regeneration occurrence-condition data indicating occurrence of a regeneration treatment of the aftertreatment device; and a regeneration division detector that detects division of the regeneration treatment by a key-off operation conducted during execution of the regeneration treatment, in which the regeneration occurrence-condition output unit outputs regeneration occurrence-condition data that is analyzable to show that a regeneration treatment before the division detected by the regeneration division detector and a regeneration treatment after the division are a series of regeneration treatments.

In the controller controlling an aftertreatment device according to the above aspect of the invention, preferably, when the regeneration division detector judges that the regeneration treatment is divided, the regeneration occurrence-condition output unit outputs the regeneration occurrence-condition data after adding division information indicating that the regeneration treatment is divided.

The controller controlling an aftertreatment device according to the above aspect of the invention preferably further includes a storage, in which, when a key-off operation is conducted during the execution of the regeneration treatment, the regeneration occurrence-condition output unit stores the regeneration occurrence-condition data in the storage, after a key-on operation, the regeneration division detector judges whether or not the regeneration treatment is divided, based on the regeneration occurrence-condition data stored in the storage, and when the regeneration division detector judges that the regeneration treatment is divided, the regeneration occurrence-condition output unit outputs the regeneration occurrence-condition data after adding the division information indicating that the regeneration treatment is divided to the regeneration occurrence-condition data stored in the storage.

The controller controlling an aftertreatment device according to the above aspect of the invention preferably further includes a storage that stores the regeneration occurrence-condition data and a regeneration treatment execution flag indicating that the regeneration treatment is in execution; and a regeneration necessity judging unit that judges whether or not the regeneration treatment of the aftertreatment device is necessary, in which the regeneration necessity judging unit sets the regeneration treatment execution flag to be ON when judging that the regeneration treatment is necessary, keeps the regeneration treatment execution flag ON when the regeneration division detector judges that the regeneration treatment is divided, and sets the regeneration treatment execution flag to be OFF when judging that the regeneration treatment becomes no longer required from being required, and the regeneration occurrence-condition output unit outputs the regeneration occurrence-condition data in a form of an integrated single data obtained from when the regeneration treatment execution flag is set ON until the regeneration treatment execution flag is set OFF.

According to another aspect of the invention, a working vehicle includes the controller of the aftertreatment device according to the above aspect of the invention.

According to still another aspect of the invention, a control system includes: the controller of the aftertreatment device according to the above aspect of the invention; and a control server that receives and acquires the regeneration occurrence-condition data outputted from the controller.

According to a further aspect of the invention, a controlling method of an aftertreatment device includes: outputting regeneration occurrence-condition data indicating occurrence of a regeneration treatment of the aftertreatment device; and detecting division of the regeneration treatment by a key-off operation conducted during execution of the regeneration treatment, in which, in the outputting of the regeneration occurrence-condition data, regeneration occurrence-condition data that is analyzable to show that a regeneration treatment before the detected division and a regeneration treatment after the detected division are a series of regeneration treatments is outputted.

In the above aspect of the invention, since the regeneration division detector is provided, the regeneration division detector can detect that the regeneration treatment is divided in response to the key-off operation during the regeneration treatment and can notify the detection to the regeneration occurrence-condition output unit. Accordingly, the regeneration occurrence-condition output unit can output the regeneration occurrence-condition data, which is analyzable to show that the regeneration treatments before and after the division are a series of regeneration treatments, to the server.

With this arrangement, even when the regeneration treatment is divided, the regeneration treatment conditions of the aftertreatment device that conducts treatments of capturing and reducing residues (e.g., PM and NOx) in the exhaust gas can be properly controlled.

BRIEF DESCRIPTION OF DRAWINGS

FIG. 4 is a view showing regeneration occurrence-condition data in the first exemplary embodiment.

FIG. 6 is a flowchart showing a control method of an aftertreatment device according to a second exemplary embodiment.

FIG. 7 is a timing chart showing a control method of the aftertreatment device according to the second exemplary embodiment.

DESCRIPTION OF EMBODIMENT(S)

Embodiments of the invention will be described below with reference to the attached drawings.

Schematic Arrangement of Control System of Aftertreatment Device

Figure 1:
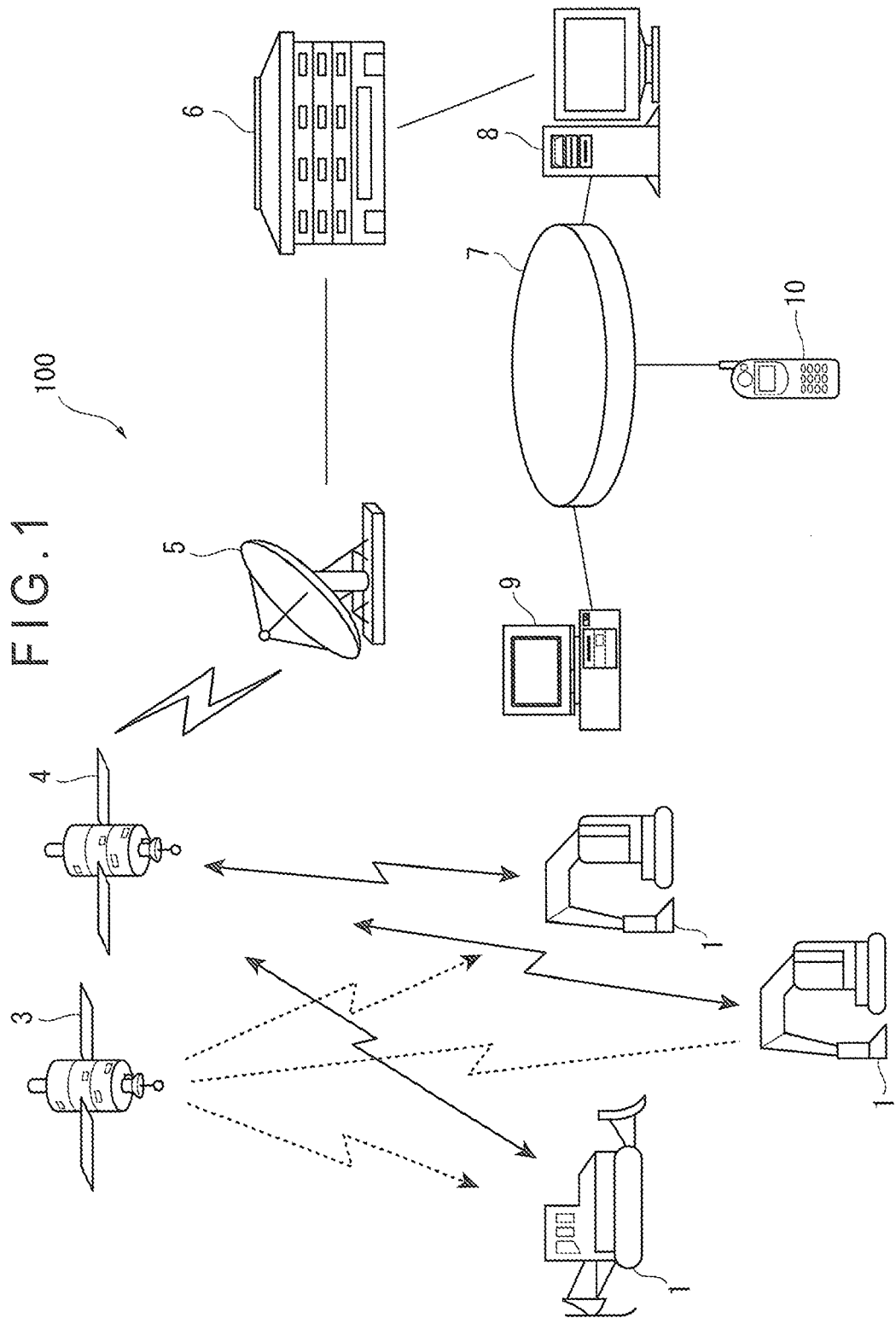
FIG. 1 is a schematic view showing a control system of an aftertreatment device according to a first exemplary embodiment of the invention.

FIG. 1 schematically shows an arrangement of a control system 100 of an aftertreatment device according to an exemplary embodiment. The control system 100 includes: a working vehicle 1, a GPS satellite 3, a communication satellite 4, a receiving device 5, a base station 6, a network 7, a server (control server) 8, a terminal computer (Personal Computer) 9, and a communication terminal 10 such as a mobile phone and a satellite communication device.

Working Vehicle

The working vehicle 1 conducts operations such as excavation and leveling and delivers earth and sand at a construction site such as mines and roads. For instance, a construction machine such as a hydraulic excavator, wheel loader, bulldozer, motor grader and crane and a delivery vehicle such as a forklift correspond to the working vehicle 1.

Controller of Working Vehicle

Figure 2:
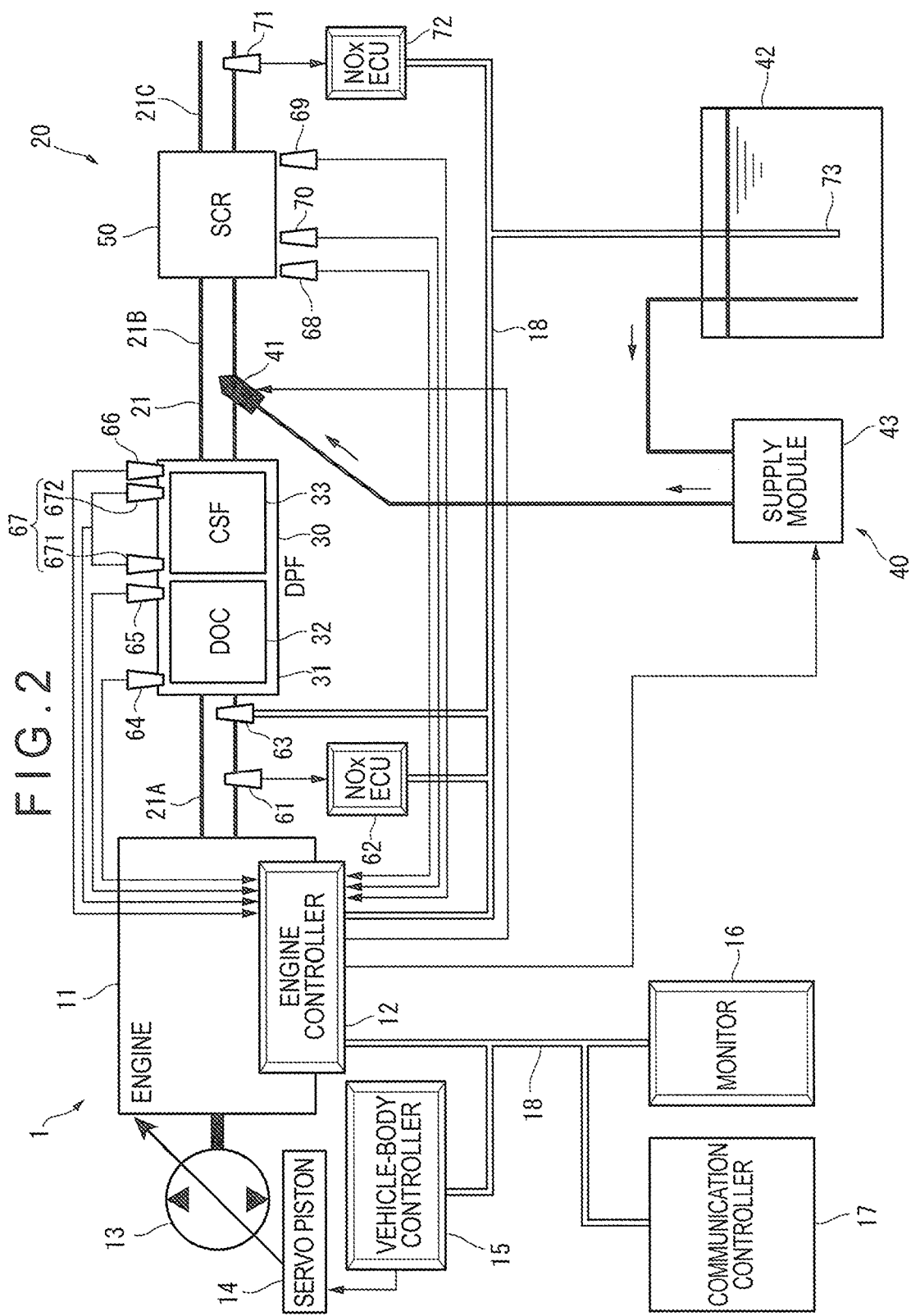
FIG. 2 is a schematic view showing an arrangement of the aftertreatment device and a control device according to the first exemplary embodiment.

As shown in FIG. 2, the working vehicle 1 includes: an engine (diesel engine) 11;

an engine controller 12 that controls the engine 11; a variable displacement hydraulic pump 13 that is driven by the engine 11 to supply hydraulic fluid to a hydraulic actuator (not shown) (e.g., a hydraulic motor for driving a rotary system and a hydraulic cylinder for driving working equipment); a servo piston 14 that changes an inclination angle of a swash plate or a bent axis of the hydraulic pump 13; a vehicle-body controller (pump controller) 15 that controls movement of the servo piston 14 to adjust a flow rate of the hydraulic pump 13; a monitor 16; and a communication controller 17 that controls an external communication using satellite communication to the communication satellite 4 and a wireless LAN (Local Area Network).

The engine controller 12, the vehicle-body controller 15, the monitor 16, and the communication controller 17 are mutually connected through a CAN (Controller Area Network) 18.

Monitor

The monitor 16 includes a display, an input unit, and a calculation unit (which are not shown). The display includes a liquid crystal display and the like. The display displays various information (e.g., a cooling water temperature and a fuel residual amount) and a caution thereon.

The input unit includes a button and the like provided around the display. The display displays a function of the input unit (button) represented by an icon or the like. With this display, the operator can easily understand which button should be pressed in order to interrupt the regeneration treatment. When the monitor 16 provided with a touch panel is used, it is only required to touch a button displayed on the touch panel.

The input unit is not limited to the button integrally provided to the monitor 16, but may be provided by a button provided in a separate casing or the like from the monitor 16.

The calculation unit transmits a command based on an input operation of setting an operation mode at the input unit to each of the controllers 12 and 15.

The calculation unit accumulates an SMR (service meter) value, which represents accumulation of operation hours, based on a signal notifying the operation of the controller 12. When the communication controller 17 communicates with the server 8, the calculation unit transmits the SMR. Herein, the SMR transmitted from the monitor 16 is transmitted based on a periodic command from the communication controller 17.

Aftertreatment Device

An aftertreatment device 20 that conducts treatments of capturing and reducing residues (e.g., PM and NOx) in exhaust gas is connected to the engine 11 of the working vehicle 1. The aftertreatment device 20 is controlled by a controller in a form of the engine controller 12 later described.

The aftertreatment device 20 includes: a diesel particulate filter (hereinafter, referred to as DPF) device 30 (a filter device); a reductant aqueous solution mixing device (hereinafter, abbreviated as a mixing device) 40; and a selective catalytic reduction (hereinafter, referred to as SCR) device 50, sequentially from an upstream side of a flow direction of exhaust gas discharged from the engine 11. These devices 30, 40 and 50 are provided in a manner to intervene in an exhaust pipe 21 through which the exhaust gas from the engine 11 flows. The exhaust pipe 21 includes: an inlet pipe 21A that introduces the exhaust gas from the engine 11 to the DPF device 30; an outlet pipe 21B that is connected to an outlet of the DPF device 30; and an outlet pipe 21C that is connected to an outlet of the SCR device 50. In the working vehicle 1 such as a hydraulic excavator, wheel loader and bulldozer, the aftertreatment device 20 is housed in the engine room together with the engine 11.

DPF Device

The DPF device 30 includes a case 31. In the case 31, a DOC (Diesel Oxidation Catalyst) 32 and a CSF (Catalyzed Soot Filter) 33 are housed.

DOC

The DOC 32 serves to oxidize a dosing fuel fed to the exhaust gas as needed to generate heat therefrom, thereby raising the temperature of the exhaust gas to a predetermined high-temperature range. The heated exhaust gas allows PM accumulated in a later-described CSF 33 to combust for removal, thereby regenerating the CSF 33. The dosing fuel is the same light oil as an engine fuel when the combustion engine is a diesel engine. The dosing fuel is fed to the exhaust gas by a dosing fuel injector provided to the exhaust pipe and then flows into the aftertreatment device 20 along with the exhaust gas. When the dosing fuel is fed into an engine cylinder, a fuel injector for the engine cylinder is also used to feed the dosing fuel.

CSF

The CSF 33 is a filter that is configured to have a number of pores and collects PM in the exhaust gas, although a detailed illustration of the CSF 33 is omitted. Each of the pores of the CSF 33 penetrates from the inflow side to outflow side of the CSF 33, the cross section of which is a polygonal shape (e.g., a hexagonal shape). The pores are provided by a first configuration in which a pore is open on the inlet side while being closed on the outlet side, and by a second configuration in which a pore is closed on the inlet side while being open on the outlet side, the first configuration and the second configuration being alternately provided. The exhaust gas inflowing from the pores of the first configuration passes through a boundary wall to flow in the pores of the second configuration, eventually flowing out to the downstream side. PM is collected on the boundary walls.

A material for the CSF 33 is ceramics such as cordierite and silicon carbide, or metal such as stainless steel and aluminium and is appropriately determined depending on usage. The CSF 33 on the inlet side may be coated with an oxidization catalyst made of a material different from the DOC 32 by wash-coating.

Mixing Device

The mixing device 40 adds a urea aqueous solution (reductant aqueous solution) into the exhaust gas. The mixing device 40 includes: a dosing module 41 that is attached to the outlet pipe 21B of the DPF device 30 and has an injector for injecting a urea aqueous solution into the outlet pipe 21B; a urea water tank 42 in which the urea aqueous solution is stored; and a supply module 43 that feeds the urea aqueous solution from the urea water tank 42 to the dosing module 41.

The dosing module 41 and the supply module 43 are controlled by the engine controller 12. The urea aqueous solution injected from the dosing module 41 into the outlet pipe 21B is thermally decomposed to ammonia by the heat of the exhaust gas.

SCR Device

The SCR device 50 reduces and purifies nitrogen oxides in the exhaust gas by using ammonia injected from the dosing module 41 as a reduction-causing agent. Ammonia is fed as the reduction-causing agent to the SCR device 50 together with the exhaust gas.

An ammonia reduction catalyst may be provided on the downstream side of the SCR device 50. The ammonia reduction catalyst oxidatively treats ammonia unused in the SCR device 50 to detoxify the ammonia, thereby more decreasing exhaust gas emission.

In the SCR 50, the injected urea is occasionally crystallized in the outlet pipe 21B to be deposited. In this case, the deposit in the outlet pipe 21B is decomposed for regeneration by increasing the temperature of the exhaust gas to a high temperature in the same manner as when regenerating the DPF device 30. Accordingly, the regeneration treatment of the aftertreatment device 20 includes the regeneration of the DPF device 30 and the regeneration of the SCR device 50.

Sensor

The aftertreatment device 20 includes various sensors for detecting regeneration treatment conditions of the aftertreatment device 20.

Specifically, the inlet pipe 21A includes: an NOx sensor 61 that detects a concentration of nitrogen oxides (NOx) contained in the exhaust gas; and a pressure sensor 63 that detects pressure of the exhaust gas.

An electronic control unit (hereinafter, referred to as ECU) 62 is connected to the NOx sensor 61. The ECU 62 calculates a value detected by the NOx sensor 61 into a concentration value and outputs the NOx concentration to the engine controller 12 through the CAN 18.

The pressure sensor 63 detects the pressure of the exhaust gas and outputs a value of the pressure of the exhaust gas to the engine controller 12 through the CAN 18.

Sensor for DPF Device

To the DPF device 30, a temperature sensor 64 that measures an inlet temperature of the DOC 32; and a temperature sensor 65 that measures an outlet temperature of the DOC 32; and a temperature sensor 66 that measures an outlet (i.e., downstream side) temperature of the CSF 33 are provided.

A differential pressure sensor 67 that measures a differential pressure between the upstream side and the downstream side of the CSF 33 is provided to the DPF device 30. The differential pressure sensor 67 includes: a pressure sensor 671 that measures a pressure on the upstream side of the CSF 33; and a pressure sensor 672 that measures a pressure on the downstream side of the CSF 33.

The sensors 64, 65, 66 and 67 each are connected to the engine controller 12 and output measured values to the engine controller 12. The engine controller 12 controls supplying the dosing fuel based on the exhaust gas temperature and the like measured by the temperature sensors 64, 65 and 66.

The differential pressure measured by the differential pressure sensor 67 is used as information for judging a clogged state of the CSF 33, in other words, information for judging a regeneration state.

Sensor for SCR Device

To the SCR device 50, a temperature sensor 68 that measures an inlet temperature of the SCR device; a temperature sensor 69 that measures an outlet temperature of the SCR device; and an ammonia sensor 70 that measures an ammonia concentration are provided.

The sensors 68, 69 and 70 each are connected to the engine controller 12 and output measured values to the engine controller 12. The engine controller 12 controls injection of the urea aqueous solution based on the exhaust gas temperature and the like measured by the temperature sensors 68 and 69. The injection of the urea aqueous solution may be controlled depending on the ammonia concentration measured by the ammonia sensor 70.

An NOx sensor 71 is provided to the outlet pipe 21C provided on the downstream side of the SCR device 50. An ECU 72 is connected to the NOx sensor 71. The ECU 72 calculates a value detected by the NOx sensor 71 into a concentration value and outputs the NOx concentration to the engine controller 12 through the CAN 18. Based on the detection values of the NOx sensor 61 and the NOx sensor 71, the engine controller 12 judges that regeneration is necessary since an NOx reduction capability of the SCR device 50 is lowered, for instance, when the NOx concentration on the downstream side of the SCR device 50 is not decreased from the NOx concentration on the upstream side thereof (i.e., when a difference between the NOx concentrations is equal to or less than a predetermined threshold), and when the NOx concentration on the downstream side of the SCR device 50 is not sufficiently decreased to a target value.

To the urea water tank 42, a sensor 73 that measures a temperature and a liquid surface level (storage amount) of a urea water in the tank is provided.

The ECU 72 and the sensor 73 are connected to the engine controller 12 through the CAN 18 in a manner to be capable of communicating with each other. With this arrangement, the ECU 72 outputs the measured NOx concentration of the exhaust gas to the engine controller 12 through the CAN 18. The sensor 73 outputs the measured temperature and the liquid surface of the urea water to the engine controller 12.

Engine Controller

Figure 3:
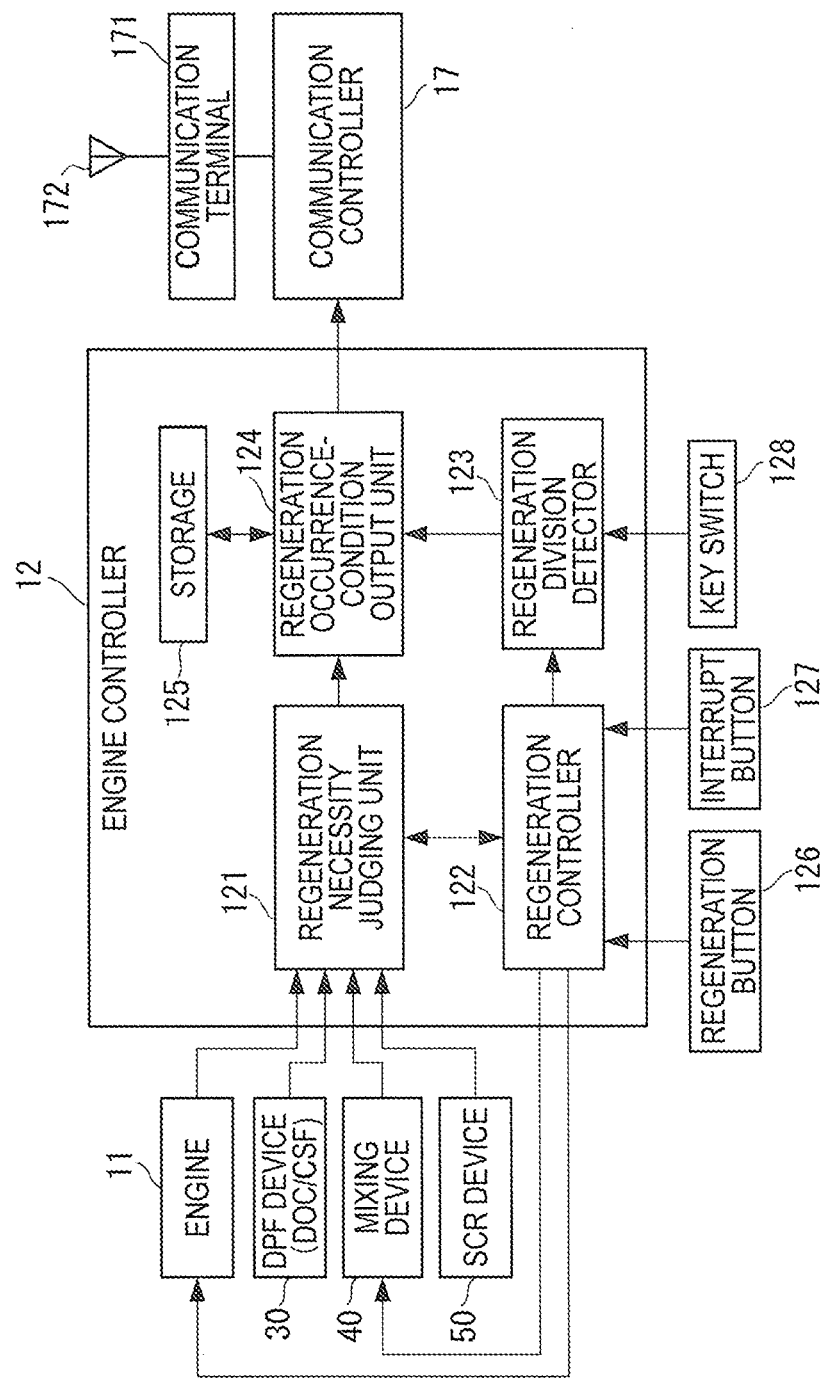
FIG. 3 is a block diagram showing the arrangement of the control device of the aftertreatment device according to the first exemplary embodiment.

Next, an arrangement of the engine controller 12 will be described. As shown in FIG. 3, the engine controller 12 includes a regeneration necessity judging unit 121, a regeneration controller 122, a regeneration division detector 123, a regeneration occurrence-condition output unit 124, and a storage 125.

Regeneration Necessity Judging Unit

The regeneration necessity judging unit 121 acquires sensor information from the sensor of each of the DPF device 30, mixing device 40, and SCR device 50 and judges whether or not the regeneration is necessary.

When the regeneration necessity judging unit 121 judges that the regeneration is necessary, the regeneration controller 122 executes a regeneration treatment (automatic regeneration treatment) while keeping the operation of the work machine. Moreover, when a manual regeneration is judged necessary because of increase in pressure loss caused, for instance, when the clogged state of the DPF device 30 is worsened, the regeneration controller 122 displays a warning to demand a manual regeneration and a regeneration button 126 to command the manual regeneration on the monitor 16. When the operator interrupts the operation of the working machine and presses the regeneration button 126, the regeneration controller 122 executes a stationary manual regeneration treatment.

Regeneration Controller

At the regeneration treatment, the regeneration controller 122 controls the fuel injector for injecting into the engine cylinder of the engine 11 to change a supply amount of the dosing fuel, thereby increasing the exhaust gas temperature, and forcibly burns PM collected in the CSF 33 for a predetermined length of time, thereby regenerating the CSF 33. Moreover, the regeneration controller 122 controls supplying the urea aqueous solution by controlling the mixing device 40. However, unlike the regeneration by the DPF device 30, the supply of the urea aqueous solution is controlled in the same manner as in the aftertreatment, in which the supply control dedicated for the regeneration control is not conducted even in the regeneration treatment.

An icon or the like for interrupting the regeneration treatment is displayed on the monitor 16 during the regeneration treatment. When the operator presses an interrupt button 127 positioned corresponding to the display of the icon for interrupt, an interrupt command is outputted from the monitor 16 to the engine controller 12. The regeneration controller 122 of the engine controller 12 interrupts the regeneration treatment in response to the interrupt command.

Regeneration Division Detector

When a key switch 128 of the working vehicle 1 is turned OFF during the execution of the regeneration treatment by the regeneration controller 122, the regeneration division detector 123 judges that the regeneration treatment is divided by the key-off operation of the working vehicle 1 and outputs the detection signal to the regeneration occurrence-condition output unit 124. In other words, when the key switch 128 is turned OFF, a sensor that detects a state of the key switch 128 detects the key-off operation. When the engine controller 12 judges from the detection result of the sensor that the key-off operation is completed, in other words, an operation for stopping the engine is completed, the engine controller 12 executes a process for stopping the engine. The engine controller 12 stores ECU operation hours (i.e., operation hours of the engine controller), division information and the like in the storage 125. The power for the engine controller 12 is stopped after completion of the storage treatment of the data.

Regeneration Occurrence-Condition Output Unit

The regeneration occurrence-condition output unit 124 calculates regeneration occurrence-condition data based on the sensor information inputted through the regeneration necessity judging unit 121 and the information through the regeneration controller 122 and the regeneration division detector 123. The regeneration occurrence-condition output unit 124 outputs the regeneration occurrence-condition data to the communication controller 17 when the regeneration treatment is completed. Moreover, the regeneration occurrence-condition output unit 124 stores in the storage 125 the regeneration occurrence-condition data given when the key switch 128 is turned OFF during the regeneration treatment to divide the regeneration treatment.

Further, when the key switch 128 is turned ON after the regeneration treatment is divided by the key-off operation of the key switch 128, the regeneration occurrence-condition output unit 124 retrieves the regeneration occurrence-condition data stored in the storage 125 and outputs the regeneration occurrence-condition data to the communication controller 17. The output of the regeneration occurrence-condition data may be displayed on the monitor 16 or be printed on a paper by a printer (not shown).

Storage

The storage 125 is provided in a form of a non-volatile memory such as EPROM (Erasable Programmable Read Only Memory) in the exemplary embodiment, but may be provided by various storages such as a semiconductor storage, magnetic storage and optical storage. Particularly, the storage 125 is preferably a non-volatile memory capable of keeping the regeneration occurrence-condition data even when power supply to the engine controller 12 and the like is stopped by the OFF operation of the key switch 128. Moreover, the storage 125 may also be provided in a form of a volatile memory such as DRAM (Dynamic Random Access Memory) in an arrangement including an uninterruptible power source such as a battery and allowing the power supply even when the key is OFF.

Communication Controller

The communication controller 17 acquires time information. Moreover, the communication controller 17 commands the controllers 12 and 15 and the monitor 16 to output information or acquires the information transmitted from the controllers 12 and 15, and stores the outputted information as needed for a periodic transmission.

The communication controller 17 judges whether it is necessary or not to transmit information to the server 8 through the communication terminal 171 periodically or in response to an event (e.g., the regeneration treatment), and transmits the information to the server when judging it necessary to transmit the information. The communication controller 17 adds the SMR and time information when transmitting the information.

The communication terminal 171 is connected with an antenna 172 and communicates with the outside of the working vehicle 1 using a satellite phone, mobile phone, wireless LAN and the like.

The communication controller 17 transmits the regeneration occurrence-condition data outputted by the regeneration occurrence-condition output unit 124 from the communication terminal 171 through the antenna 172. For instance, when a network-administering station satellite phone is used, this transmission data is transmitted to the server 8 through the communication satellite 4, the receiving device 5, the base station 6 and the network 7. When a mobile phone is used, this transmission data is transmitted to the server 8 through a base station of the mobile phone, a network-administering station and the network 7.

The server 8 stores the received regeneration occurrence-condition data in a storage of the server 8.

Regeneration Occurrence-Condition Data

FIG. 4 shows an example of regeneration occurrence-condition data 200 stored in the server 8. In FIG. 4, an event occurrence time and the SMR (Service Meter) are not contained in the data outputted from the regeneration occurrence-condition output unit 124. Herein, events relating to the regeneration treatment include a normal completion, interruption and division of the regeneration treatment. Accordingly, an event occurrence time of the normal completion of the regeneration treatment represents a completion time of the regeneration treatment and an event occurrence time of the interruption of the regeneration treatment represents an interruption time. Moreover, an event occurrence time of the division of the regeneration treatment represents the time when the regeneration treatment is divided by the key-off operation.

At the normal completion and the interruption of the regeneration treatment, the regeneration occurrence-condition output unit 124 outputs the regeneration occurrence-condition data 200 to the communication controller 17 as described later. The communication controller 17 adds the event occurrence times to the regeneration occurrence-condition data 200 and transmits the obtained data through the communication terminal 171.

On the other hand, at the division of the regeneration treatment, the regeneration occurrence-condition output unit 124 stores the regeneration occurrence-condition data 200 in the storage 125 as described later. The event occurrence time is stored in the communication controller 17. This is because a communication processing by the communication controller 17 cannot be executed either due to the stopping of the working vehicle 1 by the key-off operation. The regeneration occurrence-condition data 200 stored in the storage 125 at the division and the event occurrence time stored in the communication controller 17 are outputted to the communication controller 17 by the regeneration occurrence-condition output unit 124 at the next key-on operation as described later. The communication controller 17 adds the event occurrence time to the regeneration occurrence-condition data 200 and transmits the obtained data through the communication terminal 171.

Further, the communication controller 17 adds positional data calculated based on the satellite signal received from the GPS satellite 3 and the like to the regeneration occurrence-condition data 200 as needed.

The SMR is the data indicating the working hours of the engine 11 of the working vehicle 1 and is outputted form the monitor 16 to be added to the regeneration occurrence-condition data by the communication controller 17.

Regeneration Occurrence-Condition Data: Accumulated Regeneration-Needed Count

In the regeneration occurrence-condition data 200, the accumulated regeneration-needed count is incremented by one when the regeneration necessity judging unit 121 judges that the regeneration treatment is necessary. It should be noted that, as described later, when a key-on operation is made after the regeneration treatment is divided by the key-off operation, the regeneration necessity judging unit 121 again judges the necessity of the regeneration, and when the regeneration necessity judging unit 121 again judges that the regeneration is necessary at that time, the accumulated regeneration-needed count is also again incremented.

Regeneration Occurrence-Condition Data: Accumulated Regeneration-Interrupted Count An accumulated regeneration-interrupted count represents the number of accumulated times of interrupted regeneration treatment. Specifically, the number of times of the interrupted regeneration treatment by pressing the interrupt button 127 and the number of times of the automatic regeneration interrupted when the engine controller 12 judges that the regeneration is inefficient or the like are accumulated to provide the accumulated regeneration-interrupted count. The engine controller 12 judges that the regeneration is inefficient, for instance, when the temperature of the exhaust gas is not increased even after the elapse of a predetermined length of time after the regeneration treatment.

Accordingly, when the interrupt button 127 is pressed during the regeneration treatment, the accumulated regeneration-interrupted count is incremented.

Regeneration Occurrence-Condition Data: Accumulated Regeneration-Completed Count When the regeneration necessity judging unit 121 judges the regeneration treatment to be completed based on the sensor information and commands the regeneration controller 122 to complete the regeneration treatment, an accumulated regeneration-completed count is incremented.

Regeneration Occurrence-Condition Data: Accumulated Regeneration-Divided Count

When the regeneration division detector 123 detects the key-off operation during the regeneration treatment as described above, an accumulated regeneration-divided count is incremented.

The accumulated regeneration-needed count, accumulated regeneration-interrupted count, accumulated regeneration-completed count, and accumulated regeneration-divided count are stored in the storage 125 (i.e., a non-volatile memory) by the regeneration occurrence-condition output unit 124. With this arrangement, when a service engineer of the aftertreatment device 20 manipulates the monitor 16 at the time of replacement and the like to reset the counts, or when the engine controller 12 is replaced, the counts stored in the storage 125 are returned to an initial value "zero." Accordingly, the counts are not decreased unless the service engineer manipulates the monitor 16 to reset the counts and the engine controller 12 is replaced.

Regeneration Occurrence-Condition Data: Regeneration Start Cause

A regeneration start cause indicates a reason for starting the regeneration treatment. In the example shown in FIG. 4, three reasons of "Scheduled deSoot," "Automatic deSoot" and "Automatic deposit removal" are described.

"Scheduled deSoot" means execution of the regeneration according to a predetermined schedule (predetermined time interval and date).

"Automatic deSoot" means execution of the automatic regeneration in response to the judgment of the regeneration necessity judging unit 121 that the regeneration treatment of the DPF device 30 is necessary.

"Automatic deposit removal" means execution of the automatic regeneration in response to the judgment of the regeneration necessity judging unit 121 that an automatic removal treatment of the deposit in the SCR device 50 is necessary.

In all cases, the accumulated regeneration-needed count is incremented.

Regeneration Occurrence-Condition Data: Regeneration Duration Time; Dozing Fuel Consumption; SMR A regeneration duration time represents a duration time of each of the regeneration treatments. Accordingly, the regeneration duration time represents a duration from the start to the end of the regeneration treatment when the regeneration treatment is normally completed. On the other hand, when the regeneration treatment is interrupted by pressing the interrupt button 127, or when the regeneration treatment is divided by turning the key switch 128 OFF, the regeneration duration time represents a duration from the start to the interruption or division of the regeneration treatment.

A dozing fuel consumption represents an amount of the dozing fuel consumed in the regeneration treatment.

Regeneration Treatment Control

Figure 5:
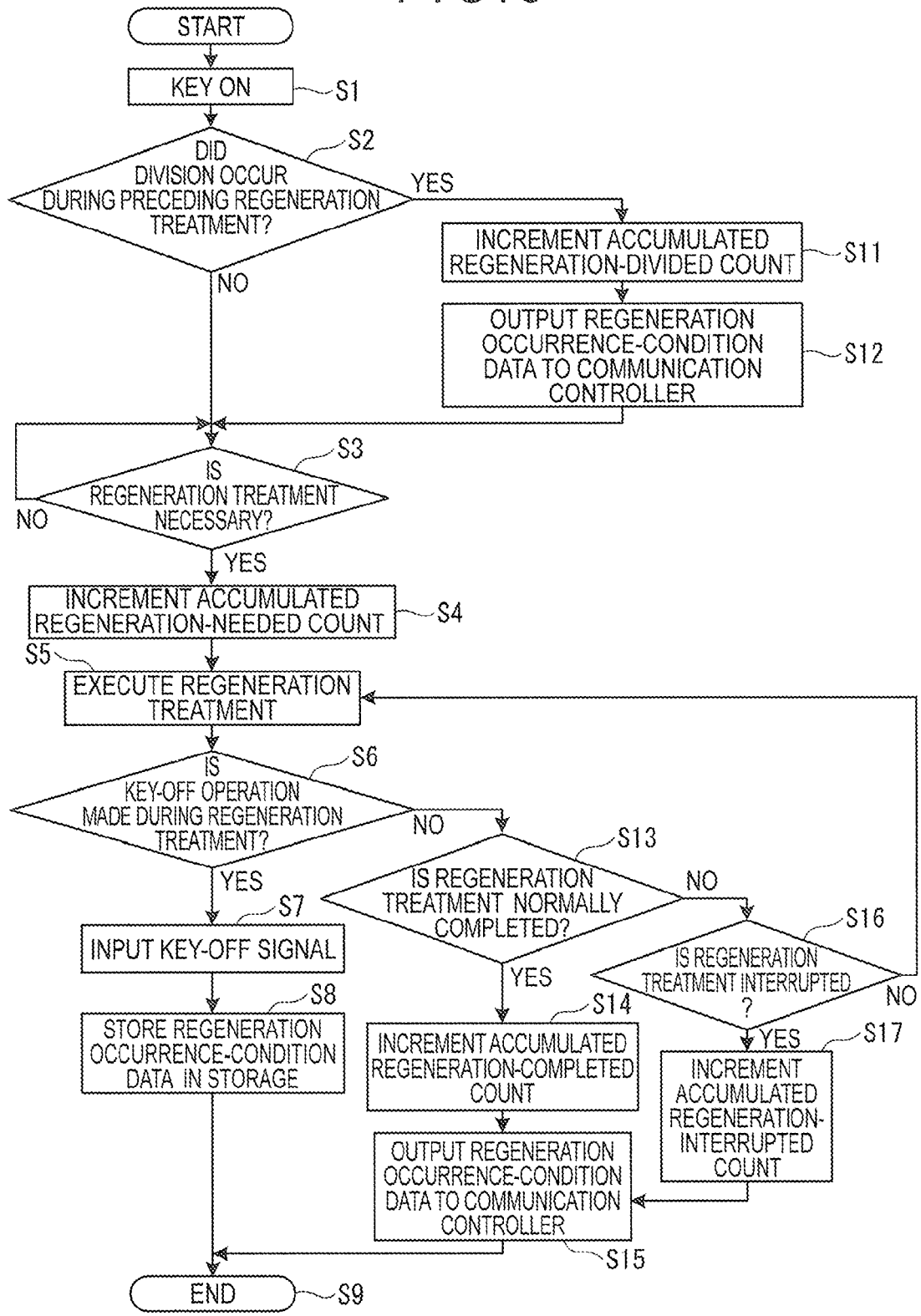
FIG. 5 is a flowchart showing a control method of the aftertreatment device according to the first exemplary embodiment.

Next, a regeneration treatment control by the engine controller 12 will be described with reference to the flowchart of FIG. 5. The regeneration treatment is conducted based on a command of the regeneration controller 122. The regeneration treatment is classified into the case where the regeneration treatment is normally completed, the case where the regeneration treatment is interrupted by the operation of the interrupt button 127, and the case where the regeneration treatment is divided by the key-off operation by the operator during the regeneration treatment. The above treatments will be described below.

Division Occurrence Judgment

When the operator conducts a key-on operation using the key switch 128 (Step S1), the regeneration necessity judging unit 121 of the engine controller 12 judges the occurrence of the division by the key-off operation during the preceding regeneration treatment (Step S2). Specifically, the regeneration necessity judging unit 121 judges the occurrence of the division by the key-off operation during the preceding regeneration treatment by confirming completion of the key-off operation during the regeneration treatment by acquiring and analyzing the regeneration occurrence-condition data stored in the storage 125 through the regeneration occurrence-condition output unit 124.

Regeneration Necessity Judgment

When the judgment in Step S2 is No, in other words, when there is no occurrence of the division during the preceding regeneration treatment, the regeneration necessity judging unit 121 acquires information of the sensors provided to the aftertreatment device 20 and judges the necessity of the execution of the regeneration treatment (Step S3). Specifically, the regeneration necessity judging unit 121 estimates the amount of PM accumulated in the DPF device 30 based on a pressure difference of the differential pressure sensor 67 provided in the CSF 33 and the like, and judges the necessity of the execution of the regeneration treatment. Moreover, when a schedule of the regeneration treatment is set, the regeneration necessity judging unit 121 judges that the execution of the regeneration treatment is necessary when a date and an operation time match the schedule of the regeneration treatment.

When the regeneration necessity judging unit 121 judges that the execution of the regeneration treatment is unnecessary (No at Step S3), the engine controller 12 does not start the regeneration treatment but continues judging the necessity of the execution of the regeneration treatment by the regeneration necessity judging unit 121 (Step S3).

Updating of Accumulated Regeneration-Needed Count

When the regeneration necessity judging unit 121 judges that the execution of the regeneration treatment is necessary (Yes at Step S3), the regeneration necessity judging unit 121 increments the accumulated regeneration-needed count by one (Step S3). It should be noted that the regeneration controller 122 may increment the accumulated regeneration-needed count.

Execution of Regeneration Treatment

Next, the regeneration controller 122 executes the regeneration treatment (Step S5). Specifically, the regeneration controller 122 controls ejection of the dozing fuel from the engine 11 and the urea aqueous solution from the mixing device 40 and executes the regeneration treatment.

Key Off Judgment During Regeneration

Next, the regeneration division detector 123 judges whether or not the key-off operation of the key switch 128 is made by the operator during the execution of the regeneration treatment (Step S6). Specifically, when the sensor for detecting the status of the key switch 128 detects the key-off operation, the engine controller 12 judges from the detection result of the sensor that the key-off operation is executed, in other words, an operation for stopping the engine is completed. Thus, the regeneration division detector 123 judges that the key-off operation is executed during the execution of the regeneration treatment.

When the judgment in Step S6 is Yes, a key-off signal is inputted from the regeneration division detector 123 to the regeneration occurrence-condition output unit 124 (Step S7).

Storage of Regeneration Occurrence-Condition Data

The regeneration occurrence-condition output unit 124 stores the regeneration occurrence-condition data in the storage 125 (Step S8). At this time, the engine controller 12 executes a process for stopping the engine and stores the ECU working hours, division information and the like in the storage 125.

Since the working vehicle 1 is stopped in response to the key-off operation, the regeneration control treatment is also terminated (Step S9). The power for the engine controller 12 is stopped after completion of the storage treatment of the data.

Key-On Operation After Division

Subsequently, when the operator manipulates the key-on operation using the key switch 128, the treatment starting from Step S1 is again executed.

Division Occurrence Judgment

When division of the regeneration treatment by the key-off operation is completed in the preceding regeneration treatment, the regeneration necessity judging unit 121 judges in Step S2 that the preceding regeneration treatment is divided (Yes in Step S2).

Updating of Accumulated Regeneration-Divided Count

Subsequently, the regeneration necessity judging unit 121 increments the accumulated regeneration-divided count by one (Step S11).

Output of Regeneration Occurrence-Condition Data

Next, the regeneration occurrence-condition output unit 124 outputs the regeneration occurrence-condition data to the communication controller 17 (Step S12). The regeneration occurrence-condition data is provided by incrementing the accumulated regeneration-needed count and the accumulated regeneration-divided count.

Regeneration Necessity Judgment

Also at the treatment in Steps S11 and S12, the regeneration necessity judging unit 121 judges the necessity of the execution of the regeneration treatment (Step S3). Also when the regeneration is again judged to be necessary in Step S3, the regeneration necessity judging unit 121 increments the accumulated regeneration-needed count (Step S4).

Next, the engine controller 12 executes the regeneration treatment in Step S5. Subsequently, the engine controller 12 judges whether or not the key-off operation is made in Step S6.

Herein, when the key-off operation is repeated during the execution of the regeneration treatment (Yes in Step S6), Steps S7 and S8 are repeated before stopping the working vehicle 1. Subsequently, with the key-on operation, the treatment starting from Step S1 is repeated.

At Normal Completion of Regeneration Treatment

On the other hand, when the key-off operation is not conducted during the execution of the regeneration treatment (No in Step S6), the regeneration necessity judging unit 121 judges whether or not the regeneration treatment is normally completed based on the acquired sensor information (Step S13).

After the normal completion of the regeneration treatment (Yes in Step S13), the regeneration necessity judging unit 121 increments the accumulated regeneration-completed count (Step S14).

The regeneration occurrence-condition output unit 124 outputs the regeneration occurrence-condition data to the communication controller 17 (Step S15) to finish the regeneration control treatment (Step S9). At this time, the regeneration occurrence-condition data is provided by incrementing the accumulated regeneration-needed count and the accumulated regeneration-completed count.

At Interruption of Regeneration Treatment

When the key-off operation is not conducted during the execution of the regeneration treatment (No in Step S6) and the regeneration treatment is not normally completed (No in Step S13), the regeneration necessity judging unit 121 judges whether or not the regeneration treatment is interrupted by pressing the interrupt button 127 (Step S16).

When the regeneration treatment is interrupted (Yes in Step S16), the regeneration necessity judging unit 121 increments the accumulated regeneration-interrupted count (Step S17).

The regeneration occurrence-condition output unit 124 outputs the regeneration occurrence-condition data to the communication controller 17 (Step S15) to finish the regeneration control treatment (Step S9). At this time, the regeneration occurrence-condition data is provided by incrementing the accumulated regeneration-needed count and the accumulated regeneration-interrupted count.

On the other hand, when the regeneration necessity judging unit 121 judges that the regeneration treatment is not interrupted (No in Step S16), the regeneration treatment is returned to Step S5 and Steps S5 to S17 are sequentially repeated.

Transmission of Regeneration Occurrence-Condition Data

When the regeneration occurrence-condition data is transmitted to the communication controller 17 in Steps S12 and S15, the communication controller 17 transmits the regeneration occurrence-condition data to the server 8 using the communication terminal 171. Until the key-on operation is conducted after the key-off operation, as long as the power of the engine controller 12, the communication controller 17, communication terminal 171 and the like is secured, each of the controllers may be activated to transmit information, for instance, during night in the key-off condition.

The server 8 accumulates the regeneration occurrence-condition data transmitted from the working vehicle 1. The aforementioned regeneration occurrence-condition data 200 in FIG. 4 is an example of the data stored in the storage of the server 8.

Analysis Example of Regeneration Occurrence-Condition Data

An administrator of the control system 100 and a data analyst can accurately analyze the regeneration occurrence-condition data 200 using the terminal computer 9 and the like. The analysis results are applicable to presumption of failure causes and estimation of maintenance timing An analysis example of the regeneration occurrence-condition data 200 in FIG. 4 will be described.

In FIG. 4, No. 5 (2013/10/7 19:06:42) data is provided by incrementing the accumulated regeneration-needed count of the No. 4 data from "12" to "13." According to the analysis, since the regeneration start cause is "Automatic deposit removal," the regeneration necessity judging unit 121 judges that the execution of the regeneration treatment is necessary in order to remove adherent substances on the DPF device 30 (Yes in Step S2), whereby the accumulated regeneration-needed count is incremented in Step S3 to start the regeneration treatment.

Moreover, since the accumulated regeneration-completed count is not changed from "12" of No. 4 data and the accumulated regeneration-divided count is incremented from "0" to "1," it can be analyzed that No. 5 data shows that: the key-off operation is made during the regeneration treatment (Yes in Step S6); with the following key-on operation to restart from Step S1, the regeneration treatment is judged Yes in Step S4; the accumulated regeneration-divided count in Step 11 is incremented; and the data is outputted in Step S12.

Moreover, since the accumulated regeneration-completed count and the accumulated regeneration-interrupted count of No. 6 (2013/10/7 19:33:09) data are not changed from the preceding No. 5 data and the No. 6 data is provided by incrementing the accumulated regeneration-needed count and the accumulated regeneration-divided count of No. 5 data by one, it can be analyzed that: the regeneration treatment is executed in Step S5 after Step S12; the key-off operation is again conducted; that the regeneration treatment is judged Yes in Step S6 and proceeds to subsequent Steps S7 and S8; the key-on operation is again conducted; and the accumulated regeneration-divided count is incremented and the data is outputted during Steps S1 to S4, S11 and S12.

In other words, according to the analysis, it can be analyzed that the data of each of Nos. 5 and 6 are outputted in Step S12 when the treatment is restarted by the key-on operation after the division, and the division by the key-off operation continuously occurs twice during the regeneration treatment.

Further, since the accumulated regeneration-needed count and the accumulated regeneration-completed count of No. 7 (2013/10/7 21:03:14) data are both incremented, it can be analyzed that, after the output of the No. 6 data in Step S12, the accumulated regeneration-needed count is incremented in Step S3 and, with the judgment of Yes at Step S13, the accumulated regeneration-completed count is incremented in Step S14, which shows the normal completion of the regeneration treatment after the division.

Moreover, since the accumulated regeneration-needed count and the accumulated regeneration-completed count of No. 8 (2013/10/10 00:29:25) data are both incremented and the regeneration start cause is "Scheduled deSoot," it can be analyzed that the regeneration treatment is a periodic regeneration treatment normally completed.

Since the value (e.g., the accumulated regeneration-needed count) of No. 10 data is decreased from that of No. 9 data, it can be judged that the value is reset between No. 9 data and No. 10 data. Because of the similar reason, it can be judged that the value is reset between No. 19 data and No. 20 data.

According to the exemplary embodiment, the accumulated regeneration-divided count is added to the regeneration occurrence-condition data transmitted from the engine controller 12 to the server 8 through the communication controller 17, by analyzing the regeneration occurrence-condition data 200 stored in the server 8, it can be understood that the key-off operation is made on the key switch 128 during the regeneration treatment to interrupt the regeneration treatment.

Accordingly, the regeneration treatment conditions can be properly judged. Especially, since the accumulated regeneration-divided count is incremented when the regeneration treatment is divided by the key-off operation during the regeneration treatment, the data including the incremented accumulated regeneration-divided count (e.g., No. 5 in FIG. 4) and the subsequent data (e.g., No. 6 in FIG. 4) are recognized as the data obtained from a series of regeneration treatments, so that the regeneration treatments before and after the division can be prevented from being erroneously judged as two separate regeneration treatments. With this arrangement, even when the regeneration treatment is divided, the regeneration treatment conditions of the after-treatment device 20 that conducts treatments of capturing and reducing residues (e.g., PM and NOx) in the exhaust gas can be properly controlled.

Moreover, since the regeneration division detector 123 is provided, the regeneration division detector 123 can detect that the regeneration treatment is divided in response to the key-off operation during the regeneration treatment and can notify the detection to the regeneration occurrence-condition output unit 124. Accordingly, the regeneration occurrence-condition output unit 124 can output the regeneration occurrence-condition data, which is analyzable to show that the regeneration treatments before and after the division are a series of regeneration treatments, to the server 8.

Accordingly, even when the regeneration occurrence-condition data is divided into two by the occurrence of the division, the analyst who analyzes the data stored in the server 8 can easily judge whether two regeneration occurrence-condition data are obtained from the series of regeneration treatments or from separate regeneration treatments. Moreover, as long as the regeneration occurrence-condition output unit 124 outputs the data obtained before and after the division as a single regeneration occurrence-condition data based on the detection results by the regeneration division detector 123, the regeneration occurrence-condition data is not divided into two. Accordingly, it can be precisely understood that the regeneration occurrence-condition data is obtained from the series of regeneration treatments.

Further, when the regeneration occurrence-condition output unit 124 separately outputs the regeneration occurrence-condition data on the regeneration treatment before the division and those after the division, the regeneration occurrence-condition output unit 124 can add division information indicating occurrence of the division (e.g., accumulated divided count) to at least one of the regeneration occurrence-condition data.

Accordingly, the analyst who analyzes the data stored in the server 8 can easily judge from presence or absence of the division information whether two regeneration occurrence-condition data are obtained from the series of regeneration treatments or from the separate regeneration treatments. Moreover, since the judgment is made based on the presence or absence of the division information, the judgment can also be automatically made by a program of the server 8.

With this arrangement, even when the regeneration treatment is divided, the regeneration treatment conditions can be properly controlled.

Further, the regeneration occurrence-condition output unit 124 stores in the storage 125 the regeneration occurrence-condition data given when the key-off operation is conducted during the regeneration treatment.

When the key-on operation is made, since the regeneration division detector 123 judges whether or not the regeneration treatment is divided based on the actual regeneration occurrence-condition data stored in the storage 125, immediately after the key-on operation, the regeneration division detector 123 can reliably judge the occurrence of the division of the regeneration treatment.

When the regeneration division detector 123 judges that the regeneration treatment is divided, since the regeneration occurrence-condition output unit 124 adds the division information to the regeneration occurrence-condition data stored in the storage 125 and outputs the obtained data, the regeneration occurrence-condition output unit 124 can output the obtained data immediately after the key-on operation after the division.

Since the division information is added, in the analysis of the data stored in the server 8, the analyst or the program can easily judge whether two regeneration occurrence-condition data are obtained from the series of regeneration treatments or from the separate regeneration treatments.

In the exemplary embodiment, when the key-on operation is again conducted to restart the regeneration treatment after the regeneration treatment is divided by the key-off operation, the accumulated regeneration-divided count of the regeneration occurrence-condition data stored in the storage 125 is incremented in Step S11 and the regeneration occurrence-condition data is outputted. However, such an arrangement is not limitative.

For instance, when the regeneration treatment is divided by the key-off operation, the regeneration occurrence-condition data in which the accumulated regeneration-divided count is incremented may be outputted to the communication controller 17 to be transmitted to the server 8 instead of storing the regeneration occurrence-condition data in the storage 125 in Step S8. In this arrangement, though the working vehicle 1 is stopped by the key-off operation of the key switch 128, the power supply to the communication controller 17 may be stopped after the transmission to the server 8 is completed. Alternatively, a power source (e.g., battery) for the communication controller 17 may be separately provided, so that, when the working vehicle 1 is stopped by the key-off operation, the communication to the server 8 may be made using the power source.

Second Exemplary Embodiment

Next, a second exemplary embodiment of the invention will be described below. In the first exemplary embodiment, the regeneration occurrence-condition data outputted from the regeneration occurrence-condition output unit 124 is added with the accumulated regeneration-divided count and the obtained data is analyzed to judge the occurrence of the division.

However, the engine controller 12 according to the second exemplary embodiment does not add the accumulated regeneration-divided count, but is configured to perform the regeneration treatment divided by the key-off operation and output the regeneration occurrence-condition data obtained before and after the occurrence of the division as an integrated single regeneration occurrence-condition data even when the division occurs. It should be noted that a description of an arrangement of the engine controller 12 herein is omitted, since the arrangement of the engine controller 12 is the same as that in the first exemplary embodiment.

A regeneration treatment control of the engine controller 12 according to the second exemplary embodiment will be described with reference to the flowchart in FIG. 6 and the timing chart in FIG. 7.

When the operator conducts the key-on operation using the key switch 128 (Step S20), the regeneration necessity judging unit 121 of the engine controller 12 judges whether or not a PM-deposition amount flag stored in the storage 125 is set ON (Step S21). The PM-deposition amount flag is set ON at the key-on operation when the preceding regeneration treatment is not normally completed as described late. Specifically, the PM-deposition amount flag is set ON when the division occurs by the key-off operation and when the regeneration treatment is interrupted using the interrupt button 127. In short, when the regeneration treatment is necessary, the PM-deposition amount flag is set ON at the key-on operation.

Judgment of Regeneration Treatment Start

When the judgment in Step S21 is No, the preceding regeneration treatment is normally completed. Accordingly, the regeneration necessity judging unit 121 judges whether or not the PM (soot) deposition amount estimated from the information obtained from the differential pressure sensor 67 and the like of the DPF device 30 is equal to or more than a predetermined threshold (Step S22), and judges whether or not another regeneration treatment is necessary.

When the regeneration necessity judging unit 121 judges that the PM-deposition amount is less than the threshold (No at Step S22), the regeneration necessity judging unit 121 does not start the regeneration treatment but continues judging the PM-deposition amount by the regeneration necessity judging unit 121 (Step S22).

Regeneration Treatment

On the other hand, when the regeneration necessity judging unit 121 judges that the PM-deposition amount is equal to or more than the threshold (Yes in Step S22), the regeneration necessity judging unit 121 sets the PM-deposition amount flag stored in the storage 125 to be ON (Step S23).

The regeneration necessity judging unit 121 increments the accumulated regeneration-needed count by one (Step S24). Further, since the regeneration necessity judging unit 121 sets the PM-deposition amount flag to be ON and judges that the regeneration treatment is necessary, the regeneration necessity judging unit 121 sets a regeneration treatment execution flag stored in the storage 125 to be ON (Step S25).

In response, the regeneration controller 122 starts the regeneration treatment (Step S26).

Key Off Judgment During Regeneration

Next, the regeneration division detector 123 judges whether or not the key-off operation of the key switch 128 is made by the operator during the execution of the regeneration treatment (Step S27).

When the judgment in Step S27 is Yes, a key-off signal is inputted from the regeneration division detector 123 to the regeneration occurrence-condition output unit 124 (Step S28). In response, as shown in FIG. 7, the regeneration treatment is stopped (OFF) and is divided.

PM-Deposition Amount Flag & Regeneration Treatment Execution Flag

As shown in FIG. 7, even when the regeneration treatment is stopped by the input of the key-off signal, the regeneration occurrence-condition output unit 124 keeps the PM-deposition amount flag and the regeneration treatment execution flag stored in the storage 125 at the ON-condition (Step S29). In other words, when the regeneration treatment is divided, the regeneration treatment execution flag is kept ON as shown by a solid line in FIG. 7 and is not changed to OFF as shown by a dotted line in FIG. 7.

Since the working vehicle 1 is stopped in response to the key-off operation, the regeneration treatment is also terminated (Step S30). When the regeneration treatment is divided by the key-off operation of the key switch 128, the regeneration occurrence-condition data is not outputted through the communication controller 17. In other words, since the regeneration treatment execution flag is kept ON, the regeneration occurrence-condition output unit 124 can judge that a series of regeneration treatments are in execution and controls so that the regeneration occurrence-condition data is not outputted at the key-off operation and at the following key-on operation.

Key-On Operation After Division

With the following key-on operation, the treatment starting from Step S20 is repeated. The regeneration necessity judging unit 121 judges whether or not the PM-deposition amount flag stored in the storage 125 is ON (Step S21). When the regeneration treatment is divided by the preceding key-off operation and when the regeneration treatment is interrupted by pressing the interrupt button 127, the PM-deposition amount flag is ON (indicating that the regeneration treatment is required). Accordingly, the regeneration necessity judging unit 121 judges Yes in Step S21.

Next, the regeneration necessity judging unit 121 judges whether or not the PM-deposition amount flag is ON (Step S31). When the regeneration treatment is divided by the preceding key-off operation, the PM-deposition amount flag is ON. Accordingly, the regeneration necessity judging unit 121 judges Yes in Step S31.

In this case, since the regeneration necessity judging unit 121 can judge that this regeneration treatment is a continuance of the regeneration treatment before the division, the regeneration necessity judging unit 121 does not update the accumulated regeneration-needed count. The regeneration controller 122 starts (restarts) the regeneration treatment (Step S26).

On the other hand, when the regeneration treatment flag is OFF in Step S31 (No in Step S31) as described later, the regeneration treatment proceeds to Step S24. The regeneration necessity judging unit 121 increments the accumulated regeneration-needed count and sets the regeneration treatment execution flag to be ON (Step S25). In response, the regeneration controller 122 starts the regeneration treatment (Step S26).

At Normal Completion of Regeneration Treatment

When the key-off operation is not conducted during the regeneration treatment (No in Step S27), the regeneration necessity judging unit 121 judges whether or not the regeneration treatment is normally completed (Step S32). For instance, when the PM-deposition amount is decreased to less than the threshold based on the sensor information acquired from the differential pressure sensor 67 and the like, the regeneration necessity judging unit 121 judges that the regeneration treatment is normally completed.

After the normal completion of the regeneration treatment (Yes in Step S32), the regeneration necessity judging unit 121 increments the accumulated regeneration-completed count (Step S33). The regeneration necessity judging unit 121 sets the PM-deposition amount flag to be OFF and the regeneration treatment execution flag to be OFF (Step S34).

After the normal completion of the regeneration treatment, the regeneration occurrence-condition output unit 124 outputs the regeneration occurrence-condition data to the communication controller 17 (Step S35) to finish the regeneration control treatment (Step S30). At this time, the regeneration occurrence-condition data is provided by incrementing the accumulation regeneration needed count and the accumulation regeneration completed count.

At Interruption of Regeneration Treatment

When the key-off operation is not conducted during the execution of the regeneration treatment (No in Step S27) and the regeneration treatment is not normally completed (No in Step S32), the regeneration necessity judging unit 121 judges whether or not the regeneration treatment is interrupted by pressing the interrupt button 127 (Step S36).

When the regeneration treatment is interrupted (Yes in Step S36), the regeneration necessity judging unit 121 increments the accumulated regeneration-interrupted count (Step S37) and sets the regeneration treatment execution flag to be OFF (Step S38).

When the regeneration treatment is interrupted, the regeneration occurrence-condition output unit 124 outputs the regeneration occurrence-condition data to the communication controller 17 (Step S35) to finish the regeneration control treatment (Step S30). At this time, the regeneration occurrence-condition data is provided by incrementing the accumulation regeneration needed count and the accumulation regeneration interrupted count.

On the other hand, when the regeneration necessity judging unit 121 judges that the regeneration treatment is not interrupted (No in Step S36), the regeneration treatment is returned to Step S27 and Step S27 and subsequent steps are sequentially repeated.

Treatment at Key-On Operation After Regeneration Treatment Interruption

When the regeneration treatment is interrupted (Yes in Step S36), Steps S37 and S38 are performed to finish controlling the regeneration treatment in Step S30 and, subsequently, the key-on operation is conducted, the PM-deposition amount flag is still kept ON and the regeneration treatment execution flag is already set OFF in Step S38. Accordingly, the regeneration necessity judging unit 121 judges Yes in Step S21 and No in Step S31. In response, the regeneration necessity judging unit 121 increments the accumulated regeneration-needed count (Step S24) and sets the regeneration treatment execution flag to be ON (Step S25). Consequently, the regeneration controller 122 starts the regeneration treatment (Step S26).

Transmission of Regeneration Occurrence-Condition Data

When the regeneration treatment is normally completed (Yes in Step S32) and when the regeneration treatment is interrupted (Yes in Step S36), the regeneration occurrence-condition data is outputted to the communication controller 17 (Step S35). In response, the communication controller 17 transmits the regeneration occurrence-condition data to the server 8 using the communication terminal 171. Until the key-on operation is conducted after the key-off operation, as long as the power of the engine controller 12, the communication controller 17, communication terminal 171 and the like is secured, each of the controllers may be activated to transmit information, for instance, during night in the key-off condition.

The regeneration necessity judging unit 121 judges the necessity of the regeneration treatment by detecting the deposition amount of the particulate substances and the NOx concentration. When the regeneration treatment is judged to be necessary, the regeneration treatment execution flag stored in the storage 125 is set ON. When the regeneration necessity judging unit 121 judges that the regeneration treatment becomes no longer required from being required, the regeneration necessity judging unit 121 sets the regeneration treatment execution flag to be OFF. On the other hand, when the key-off operation is conducted during the regeneration treatment, the regeneration necessity judging unit 121 keeps the regeneration treatment execution flag to be ON.

The regeneration occurrence-condition output unit 124 does not output the regeneration occurrence-condition data when the regeneration treatment execution flag is ON, but outputs the regeneration occurrence-condition data at the point when the regeneration treatment execution flag is turned OFF from ON. With this arrangement, since the regeneration occurrence-condition data is not outputted at the occurrence of the division, a single regeneration occurrence-condition data is outputted in the series of regeneration treatments before and after the division. Accordingly, since the regeneration occurrence-condition data is not divided into two at the occurrence of the division, the regeneration treatment is properly understood to be a series of regeneration treatments. Thus, even when the regeneration treatment is divided, the regeneration treatment conditions can be properly controlled.

In the second exemplary embodiment, since the regeneration treatment execution flag is kept ON when the regeneration treatment is divided and at the first key-on operation after the division, the regeneration occurrence-condition data is not outputted. With this arrangement, since the regeneration occurrence-condition data is outputted in a form of an integrated single data provided by integrating the data of the regeneration treatments before and after the division, the regeneration occurrence-condition data can be properly analyzed even when the regeneration occurrence-condition data stored in the server 8 is analyzed. It should be noted that the second exemplary embodiment does not include the division information data (accumulated regeneration-divided count) directly indicating the occurrence of the division. Accordingly, in order to analyze the occurrence of the division, the occurrence of the division may be judged based on whether or not the key switch is turned OFF while the regeneration treatment execution flag is kept ON.

The invention is not limited to the above-described present embodiments, but includes modifications and improvements as long as an object of the invention can be achieved.

For instance, the division information used in the first exemplary embodiment is not limited to the accumulated regeneration-divided count, but may be the flag information indicating the occurrence of the division. For instance, the flag information representing the occurrence of the division by "1" and no occurrence of the division by "0" may be used. However, with use of the accumulated regeneration-divided count, not only the occurrence of the division but also the accumulated divided count can be advantageously recognized at the same time.

Similarly, the accumulated regeneration-needed count, the accumulated regeneration-interrupted count, and the accumulated regeneration-completed count in the regeneration occurrence-condition data 200 are not limited to the data on the accumulated count, but may be provided by flag information.

Further, data items contained in the regeneration occurrence-condition data 200 are not limited to those in the first exemplary embodiment, but may be added with other information.

At the occurrence of the division, the regeneration occurrence-condition output unit 124 according to the first exemplary embodiment outputs the data of the series of regeneration treatments as a plurality of regeneration occurrence-condition data. However, the plurality of data may be outputted to be stored in the storage 125, and the regeneration occurrence-condition output unit 124 may output to the server 8 the plurality of regeneration occurrence-condition data stored in the storage 125 in a form of an integrated single regeneration occurrence-condition data.

The regeneration necessity judging unit 121 according to the second exemplary embodiment judges in Step S21 based on the PM-deposition amount flag, in other words, whether or not the regeneration in the DPF device 30 is necessary. However, when the regeneration of the SCR device 50 is also required, the regeneration necessity judging unit 121 is only required to judge in Step S21 based on the necessity of the regeneration in at least one of the DPF device 30 and the SCR device 50. In other words, in Step S21, it is only required to be judged whether or not the regeneration of the aftertreatment device 20 is necessary.

The invention is applicable not only to a construction machine such as a hydraulic excavator but also to various working vehicles provided with the aftertreatment device 20.

Further, in the above exemplary embodiments, the regeneration occurrence-condition data is stored in the server 8 and the data stored in the server 8 is analyzed. However, the regeneration occurrence-condition data may be stored in the storage 125 of the working vehicle 1 and a service engineer who maintains the working vehicle 1 may analyze the data stored in the storage 125.

The invention claimed is:

1. A controller controlling an aftertreatment device for a residual substance in exhaust gas, the controller comprising:
    a regeneration occurrence-condition output unit that outputs regeneration occurrence-condition data indicating occurrence of a regeneration treatment of the aftertreatment device; and
    a regeneration division detector that detects division of the regeneration treatment by an operation for stopping an engine with a key-off operation conducted during execution of the regeneration treatment, wherein
    the regeneration occurrence-condition output unit outputs regeneration occurrence-condition data that is analyzable to show that a regeneration treatment before the division detected by the regeneration division detector and a regeneration treatment after the division are a series of regeneration treatments.

2. The controller of the aftertreatment device according to claim 1, wherein
    when the regeneration division detector judges that the regeneration treatment is divided, the regeneration occurrence-condition output unit outputs the regeneration occurrence-condition data after adding division information indicating that the regeneration treatment is divided.

3. The controller of the aftertreatment device according to claim 2, further comprising:
    a storage, wherein
    when a key-off operation is conducted during the execution of the regeneration treatment, the regeneration occurrence-condition output unit stores the regeneration occurrence-condition data in the storage, after a key-on operation, the regeneration division detector judges whether or not the regeneration treatment is divided, based on the regeneration occurrence-condition data stored in the storage, and when the regeneration division detector judges that the regeneration treatment is divided, the regeneration occurrence-condition output unit outputs the regeneration occurrence-condition data after adding the division information indicating that the regeneration treatment is divided to the regeneration occurrence-condition data stored in the storage.

4. The controller of the aftertreatment device according to claim 1, further comprising:

a storage that stores the regeneration occurrence-condition data and a regeneration treatment execution flag indicating that the regeneration treatment is in execution; and a regeneration necessity judging unit that judges whether or not the regeneration treatment of the aftertreatment device is necessary, wherein the regeneration necessity judging unit sets the regeneration treatment execution flag to be ON when judging that the regeneration treatment is necessary, keeps the regeneration treatment execution flag ON when the regeneration division detector judges that the regeneration treatment is divided, and sets the regeneration treatment execution flag to be OFF when judging that the regeneration treatment becomes no longer required from being required, and the regeneration occurrence-condition output unit outputs the regeneration occurrence-condition data in a form of an integrated single data obtained from when the regeneration treatment execution flag is set ON until the regeneration treatment execution flag is set OFF.

5. A working vehicle comprising the controller of the aftertreatment device according to claim 1.

6. A control system comprising:

the controller of the aftertreatment device according to claim 1; and a control server that receives and acquires the regeneration occurrence-condition data outputted from the controller.

7. A controlling method of an aftertreatment device comprising:

outputting regeneration occurrence-condition data indicating occurrence of a regeneration treatment of the aftertreatment device; and detecting division of the regeneration treatment by an operation for stopping an engine with a key-off operation conducted during execution of the regeneration treatment, wherein in the outputting of the regeneration occurrence-condition data, regeneration occurrence-condition data that is analyzable to show that a regeneration treatment before the detected division and a regeneration treatment after the detected division are a series of regeneration treatments is outputted.

8. The controlling method of claim 7, further comprising incrementing an accumulated regeneration-divided count based on the detecting of the division of the regeneration treatment by the operation for stopping the engine with the key-off operation conducted during execution of the regeneration treatment.

9. The controller of the aftertreatment device according to claim 1, wherein the controller is configured to increment an accumulated regeneration-divided count based on the detection of the division of the regeneration treatment by the operation for stopping the engine with the key-off operation during execution of the regeneration treatment.

10. A controller controlling an aftertreatment device for a residual substance in exhaust gas, the controller comprising:

a regeneration occurrence-condition output unit configured to output regeneration occurrence-condition data indicating occurrence of a regeneration treatment of the aftertreatment device; and a means for detecting regeneration division, the means for detecting regeneration division being configured to detect division of the regeneration treatment by an operation for stopping an engine with a key-off operation conducted during execution of the regeneration treatment, wherein the regeneration occurrence-condition output unit is configured to output regeneration occurrence-condition data that is analyzable to show that a regeneration treatment before the division detected by the means for detecting regeneration division and a regeneration treatment after the division are a series of regeneration treatments.

11. The controller of the aftertreatment device according to claim 10, wherein based on the means for detecting regeneration division judging that the regeneration treatment is divided, the regeneration occurrence-condition output unit is configured to ouptut the regeneration occurrence-condition data after adding division information indicating that the regeneration treatment is divided.

12. The controller of the aftertreatment device according to claim 11, further comprising a storage, wherein:

based on a key-off operation being conducted during the execution of the regeneration treatment, the regeneration occurrence-condition output unit is configured to store the regeneration occurrence-condition data in the storage, based on a key-on operation being conducted, the means for detecting regeneration division is configured to judge whether or not the regeneration treatment is divided according to the regeneration occurrence-condition data stored in the storage, and based on the means for detecting regeneration division judging that the regeneration treatment is divided, the regeneration occurrence-condition output unit is configured to output the regeneration occurrence-condition data after adding the division information indicating that the regeneration treatment is divided to the regeneration occurrence-condition data stored in the storage.

13. The controller of the aftertreatment device according to claim 10, further comprising:

a storage configured to store the regeneration occurrence-condition data and a regeneration treatment execution flag indicating that the regeneration treatment is in execution; and a regeneration necessity judging unit configured to judge whether or not the regeneration treatment of the aftertreatment device is necessary, wherein the regeneration necessity judging unit is configured to set the regeneration treatment execution flag to be ON based on judging that the regeneration treatment is necessary, keep the regeneration treatment execution flag ON based on the means for detecting regeneration division judging that the regeneration treatment is divided, and set the regeneration treatment execution flag to be OFF based on judging that the regeneration treatment becomes no longer required from being required, and the regeneration occurrence-condition output unit is configured to output the regeneration occurrence-condition data in a form of an integrated single data obtained from based on the regeneration treatment execution flag being set ON until the regeneration treatment execution flag is set OFF.

14. A working vehicle comprising the controller of the aftertreatment device according to claim 10.

15. A control system comprising:
the controller of the aftertreatment device according to claim 10; and
a control server that is configured to receive and acquire the regeneration occurrence-condition data outputted from the controller.

16. The controller of the aftertreatment device according to claim 10, wherein the controller is configured to increment an accumulated regeneration-divided count based on the detection of the division of the regeneration treatment by the operation for stopping the engine with the key-off operation key-off operation during execution of the regeneration treatment.

\* \* \* \* \*